United States Patent
DiGiambattista (12)

(10) Patent No.: US 10,148,752 B2
(45) Date of Patent: Dec. 4, 2018

(54) ENTERPRISE LEVEL SECURITY ORCHESTRATION

(71) Applicant: CYBRIC Inc., Boston, MA (US)

(72) Inventor: Ernesto DiGiambattista, Lynnfield, MA (US)

(73) Assignee: Cybric Inc., Boston, MA (US)

( * ) Notice: Subject to any disclaimer, the term of this patent is extended or adjusted under 35 U.S.C. 154(b) by 172 days.

(21) Appl. No.: 15/181,008

(22) Filed: Jun. 13, 2016

(65) Prior Publication Data

US 2017/0017795 A1 Jan. 19, 2017

Related U.S. Application Data

(60) Provisional application No. 62/192,018, filed on Jul. 13, 2015.

(51) Int. Cl.
| | |
|---|---|
| *G06F 21/00* | (2013.01) |
| *H04L 29/08* | (2006.01) |
| *G06F 21/57* | (2013.01) |
| *G06F 8/61* | (2018.01) |
| *G06F 9/455* | (2018.01) |

(52) U.S. Cl.
CPC ............ *H04L 67/1095* (2013.01); *G06F 8/61* (2013.01); *G06F 9/45512* (2013.01); *G06F 21/577* (2013.01)

(58) Field of Classification Search
CPC .............................. H04L 67/1095; G06F 8/61

USPC ..................................................... 726/22–25
See application file for complete search history.

(56) References Cited

U.S. PATENT DOCUMENTS

| 8,918,775 B1 * | 12/2014 | Carpenter ........... G06F 9/44505 |
| | | 709/203 |
| 2011/0126099 A1 | 5/2011 | Anderson et al. |
| 2014/0237550 A1 | 8/2014 | Anderson et al. |
| 2016/0085543 A1 | 3/2016 | Islam et al. |

OTHER PUBLICATIONS

PCT/US2018/042357, International Search Report and Written, dated Sep. 27, 2018, 12 pages.
U.S. Appl. No. 15/658,022, Office Action, dated Oct. 2, 2018, 8 pages.

* cited by examiner

*Primary Examiner* — Anthony D Brown
(74) *Attorney, Agent, or Firm* — Han Santos, PLLC

(57) ABSTRACT

Enterprise level security orchestration coordinates the safeguarding functions of safeguard software packages with respect to an installation. Multiple safeguard software packages may be deployed on an installation at a storage location. The multiple safeguard software packages may provide different safeguarding functions to applications or application data on the installation. An orchestration tool on the installation may interface with the multiple safeguard software packages. Accordingly, the orchestration tool may execute an orchestration routine that calls the individual safeguard software packages to perform the different safeguarding functions.

18 Claims, 5 Drawing Sheets

ENTERPRISE LEVEL SECURITY ORCHESTRATION

CROSS REFERENCE TO RELATED PATENT APPLICATION

This application claims priority to U.S. Provisional Patent Application No. 62/192,018, filed on Jul. 13, 2015, entitled "Enterprise Level Security Orchestration," which is hereby incorporated by reference in its entirety.

BACKGROUND

Present day enterprises have come to rely on mission critical computing systems. Such systems may include automation for accounting, finance, human resources, and other enterprise automation. Without automation, enterprises might not be able to service a large number of customers, would not be able to quickly determine who they owed money to or who owed them money, or be able to collaborate on work product. Indeed, if an enterprise's automation were to be compromised, that enterprise may run the risk of facing losses tantamount to going out of business. Accordingly, the ability for an enterprise to protect, backup, and recover from automation failures and threats is tantamount to ensuring not only the enterprise's health, but indeed its survival.

Accordingly, various vendors have made product offerings to safeguard enterprise systems and data. Examples include: Qualys™, Check Point Software™ and Fortinet™. However, different safeguarding software systems, may each have a different focus. One system may protect server side computing instances, but may not protect client side software. Another system may provide proactive security scanning, but may not offer recovery assistance in the case of compromise. Worse, rather than working in concert, different systems may inadvertently act against each other.

Accordingly, enterprises have turned to installing a number of safeguarding software systems to automate the protection, backup, recovery of their mission critical computing systems. However, presently, there is no technology to orchestrate the response of these diverse safeguarding software systems in a unified and coherent fashion. Furthermore, as a consequence of there being no present orchestration technology, there is no present way for enterprises to perform orchestrated self-healing and response in the event of a security breach.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
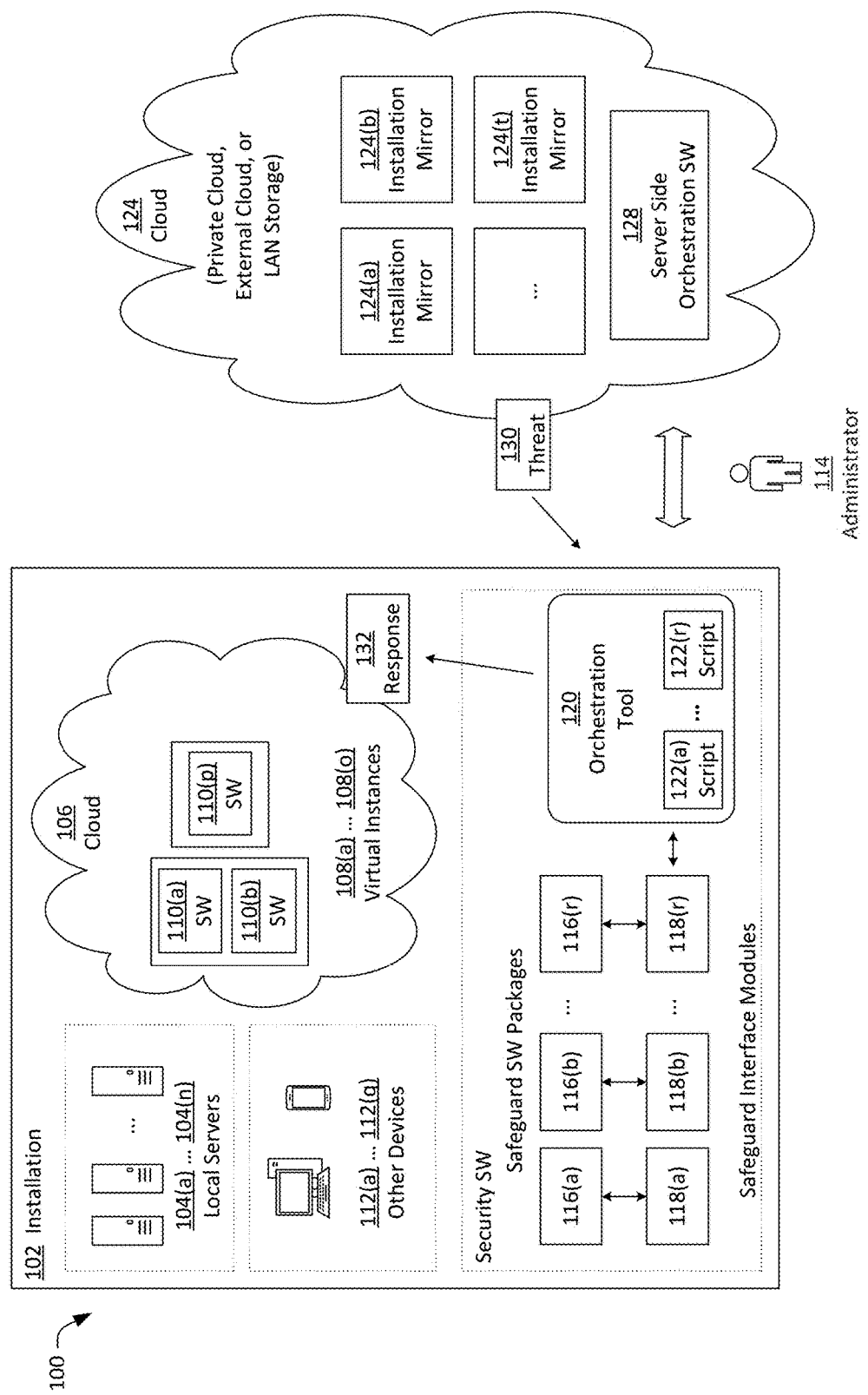
FIG. 1 is a top level context diagram of enterprise level security orchestration.

Qualitative Description of Enterprise Level Security Orchestration

Presently there is an unmet need to perform enterprise level security orchestration. Herein is described a system and methods to provide such enterprise level security orchestration. As described above, there presently exist a number of commercial enterprise safeguarding systems for enterprises. These systems can perform threat scanning, mirroring, recovery, and other functions. However, typical large enterprises may deploy several of these safeguarding systems, and presently those safeguarding systems are not orchestrated to act in concert. There exist a large number of scenarios, such passive and active scanning, end to end threat penetration testing, and application recovery, where the several deployed safeguarding systems are used in concert. In the scanning instance, an enterprise may desire to first run a scan using Qualys™ and the afterwards run a scan using BeyondTrust™ to ensure that the latter caught what the former might have missed.

The orchestration function may be met by providing an orchestration tool where different safeguard software packages, such as Qualys™, Check Point™ and Fortinet™ have corresponding safeguard interface modules to interface a respective safeguard software package with the orchestration tool. In this way, the orchestration tool could run orchestration routines that utilized some or all of the safeguard software packages to perform security testing or other security functions on the enterprise.

Addressing the above would provide the orchestration portion of enterprise level security orchestration. However, to make the security orchestration function enterprise level, the present system ideally would have the ability to perform security testing and other security functions isolated from production systems. Accordingly, the orchestration tool would have access to a mirror of the entire enterprise, in effect creating an enterprise size sandbox. Because the amount of data for the enterprise, there are technical challenges addressed herein to enable timely, enterprise scope sandboxing.

Accordingly, preparing an orchestration tool, interfaced with various safeguard software packages via corresponding safeguard interface modules, with access to storage sufficient for enterprise scale mirroring, and mirroring functions with sufficient performance to perform mirroring in a timely fashion, would provide enterprise level security orchestration.

Enterprise level security orchestration enables security testing and safeguarding functions that are functions that support a security scenario. Scenarios include, without limitation:
Vulnerability scanning
Active scanning
Penetration test scanning
Web application scanning
End to end scanning
Software development scanning
Pre-release scanning
White hat/tiger team methodology scanning
Remediation management
Reporting management The above scenarios are not performed in a vacuum. Many of the above scenarios are performed in concert with other enterprise operations. By way of example, consider developer operations which comprise a development life cycle and a test life cycle. Specifically when enterprise critical applications are developed, they are typically developed according to a software development methodology, which compartmentalizes different phases of development. In doing so, the methodology offers checkpoints where work product, such as documentation and working code, may be tested. By detected potential problems early in development, those problems if properly corrected will not propagate-the system.

One example of a software development methodology is called the "waterfall model." In the waterfall model, software is roughly subdivided into the following phases. The first phase is "strategy" where the goals of the project are identified and sponsorship/funding is secured. The second phase is "requirements" where what the software is to do, is specified in a formal requirements document. The third phase is "design" where how the software is to be implemented is specified in a formal design document. For example, the requirements document may specify that four fields are to be used to specify an employee. The design document may show an input form for the employee and specify the use of Visual C# and a .NET runtime for implementation. The fourth phase is implementation, where the design is coded. The fifth phase is test, where the coded project is put into acceptance testing, and bugs are fixed. Upon passing acceptance, the sixth phase is deployment, where the software is rolled out to production.

In the waterfall model, enterprise level security orchestration may be applied during the test phase as part of acceptance testing. While it is not expected that information technology developers will introduce malware, their preliminary code might introduce security flaws, such as open ports or unintentionally unsecured modules. Those, and other security problems may accordingly be detected via enterprise level security orchestration.

Presently, more contemporary software development methodologies have become more iterative. Specifically, because it was possible to hold up development until the completion of a comprehensive functional requirements document, software development methodologies, such as "Agile", arose in response where development was subdivided across multiple development efforts of smaller and more discrete software features. Developing on such feature could be done in a short period of time called a "sprint". Accordingly, development of a single software product might comprise multiple sprints.

Enterprise level security orchestration lends itself very well to such contemporary software development methodologies. Enterprise level security orchestration may be applied to the software product under development after each sprint. Because of the scalable nature of enterprise level security orchestration, multiple mirrors of an installation may be tested for security synchronously. Synchronous testing is described in greater detail with respect to FIG. 5. Thus, enterprise level security orchestration may be integrated with development operations, including contemporary Agile software development methodologies, as well as other enterprise operation methodologies.

Exemplary Context Diagram of Enterprise Level Security Orchestration

FIG. 1 provides an exemplary context diagram 100 for enterprise level security orchestration. Enterprises have an information technology installation 102 comprising all computing, networking, and storage devices used by the enterprise and their software. An installation may include several local servers 104(a)-104(n), sited on the enterprise's premises. An installation may also include cloud infrastructure 106 provided by one or more cloud providers on one or more cloud virtual instances 108(a)-108(o). On those local servers 104 and/or the cloud virtual instances 108, the enterprise may install enterprise software systems 110(a)-110(p) that automate enterprise operations across the enterprise, such as accounting, finance, customer relations management.

An installation 102 is not limited to server side. An installation may include other devices 112(a)-112(q) that may include client personal computers, tablets, cell phone, and other mobile devices, along with their respective client software.

An installation 102 is generally overseen by an administrator 114, whose responsibilities include the security of the installation 102. Accordingly, the administrator 114 may typically deploy a number of commercially available safeguard software packages 116(a)-116(r). As described above, exemplary safeguard software packages 116 may include, but are not limited to, Qualys™, Check Point Software™ and Fortinet™. In general, a safeguard software package 116 is any software package deployed by the administrator to perform a safeguarding or security function that is to work with the other safeguard software packages 116.

Each safeguard software package 116, has a corresponding safeguard interface module 118(a)-(r). Because different safeguard software packages 116 have different means of automation and different functions, and because the safeguard software packages 116 are likely to have changing versions over time, the safeguard interface module 118(a)-(r) provides a layer of software to provide a consistent interface to abstract away the changing nature of the underlying safeguard software packages 116.

The safeguard interface modules 118 interface to an installation side orchestration tool 120. The orchestration tool provides the administrator 114 with a user interface, including a dashboard to receive notifications and alerts from the safeguard software packages 116 in an integrated fashion.

From time to time, the administrator may choose to automate the safeguard software packages 116, generally in concert with each other. This is accomplished via, orchestration routines 122(a)-122(s). An orchestration routine 122 is a script which can make calls to the safeguard software packages 116, via the automation interfaces provided by the safeguard interface modules 118. Specifically, after an administrator programs and deploys a script 122 to run at specified times and/or specified intervals, the orchestration tool 120 may run the script 122 at the appointed time via a runtime that is part of the orchestration tool. When the script invokes a call to a safeguard software package 116, the runtime may call the respective safeguard interface module 118, which in turn performs the automation call specific to the safeguard software package 116. For example, if the safeguard software package 116 proffers a Component Object Module or a .NET™ interface, the safeguard interface module 118 may be configured to invoke such interfaces. If the safeguard package 116 does not have native automation, automation may be performed-alternatives, such as journaling hooks.

Because the orchestration tool 120 executes the scripts 122, it also receives all the results of the safeguarding and security operations such as passive and active scans. Accordingly, the orchestration tool can include an analytics function which stores the results, performs analysis, and detects patterns of threats. In this way, the administrator 114 may change the configuration of the safeguard packages to close off threats. In some cases, the orchestration tool 120 may automatically respond to close off threats. Such automation may also be performed by programmed scripts 122.

Scripts 122 may implement different security methodologies. Accordingly, an advantage of the centralized orchestration tool 120 is the ability of the administrator 114 to implement multiple methodologies across multiple safeguard software packages 116.

As described above, it may be desirable to perform security and safeguard functions isolated from production systems. An example scenario includes testing software or data, prior to incorporation into production. In such a scenario, it is desirable to replicate all, or part of an installation 102. Because of the cloud, storage costs have dropped sufficiently to make large scale replication feasible. Alternatively, a well-funded enterprise could opt to implement a private cloud and have the replication storage local on premises. Finally, commercial software, such as Actifio™ provide the means to perform timely replication of an entire or a portion of an installation 102.

Accordingly, cloud 124 may be external or alternatively on premises. Cloud 124, provides storage and infrastructure to host full or partial mirrors 126(*a*)-(*t*) of installation 102. The server side orchestration software 128 is communicatively controlled by the orchestration tool 120. The server side orchestration software 128 provides coordination of the creation/destruction of mirrors 126, of the installation 102. The server side orchestration software 128 also provides for performing security testing and safeguarding functions on the mirrors 126.

One way to make use of a mirror 126 is to perform testing on the mirror sequentially and asynchronously. For example, an administrator 114 may perform a scan using Qualsys™ first, and thereafter may scan using BeyondTrust™.

However, an advantage of the present system is that multiple mirrors 126 of the same enterprise installation 102 may be made. Accordingly, in the above scenario, two mirrors 126 could be made, and Qualsys™ run on the first and BeyondTrust™ run on the second. In this way, scanning is performed synchronously and the time to perform the scans could be substantially reduced to the time of a single scan. Synchronous scanning is described in further detail with respect to FIG. 5.

Beyond time savings, an administrator 114 may make mirrors 126 corresponding not only to safeguard software packages 116, but also to methodologies. Thus, if the an administrator 114 wished to run five different methodologies, using multiple safeguard software packages 116, that could be achieved by creating a mirror 126 for each methodology. Thus, an administrator is more likely to detect threats and breaches.

Mirrors 126 may be destroyed at will. Accordingly, any security threat detected is destroyed, and data replicas will not persist to create the security risk that the data replicas are breached. As previously mentioned, mirrors 126 are isolated from production. When scans are performed on production, often production performance suffers due to the computing resource load of the scan. However, since mirrors 126 are isolated from production, a scan on a mirror 126 will not affect production performance. Accordingly, it is feasible to run continuous scans without adversely impacting the enterprise.

The orchestration tool 120 and by extension the server side orchestration software 128, include an analytics collector, a remediation engine, and a security reporting module. Thus, the orchestration tool 120 has the ability to detect a threat 130, and correspondingly to make a response 132. The internals of the orchestration tool 120 and the server side orchestration software 128 are described in further detail with respect to FIG. 4.

Exemplary Hardware, Software and Communications Environment

Figure 2:
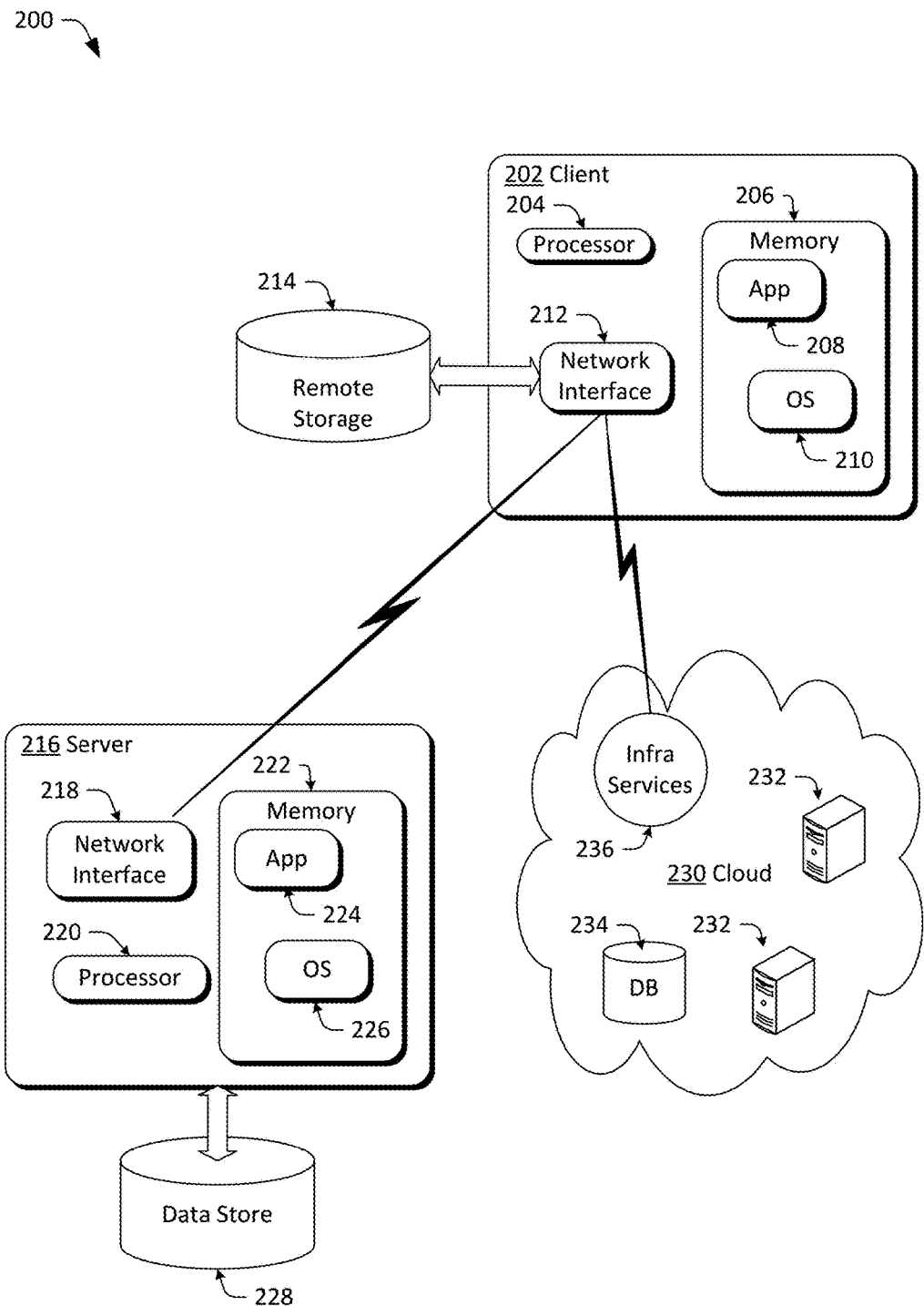
FIG. 2 is an environment diagram illustrative of hardware, software, and communications infrastructure for enterprise level security orchestration.

Prior to disclosing enterprise level security orchestration and related techniques, an exemplary hardware, software and communications environment is disclosed. FIG. 2 illustrates several possible embodiments of a hardware, software and communications environment 200 for enterprise level security orchestration and related techniques.

Client device 202 is any computing device. Exemplary computing devices include without limitation personal computers, tablet computers, smart phones, and smart televisions and/or media players.

Enterprise level security orchestration and related techniques may be used in a number of platform contexts. Although enterprise level security orchestration and related techniques may be brought to bear on a typical networked client device 202 accessing a remote server, enterprise level security orchestration and related techniques alternatively may be implemented on a networked computer. Accordingly, those techniques might be performed on a client device 202 that is a personal computer or alternatively a portable laptop.

A client device 202 may have a processor 204 and a memory 206. The memory 206 of the client device 202 may be any computer-readable media which may store several software components including an application 208 and/or an operating system 210. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD), Blu-Ray or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, client device 202 may have a network interface 212. The network interface 212 may be one or more network interfaces including Ethernet, Wi-Fi, or any number of other physical and data link standard interfaces. In the case where the user need only do operations on a standalone single machine, the network interface 212 is optional.

Client 202 may communicate to a server 216. Server 216 is any computing device that may participate in a network. The network may be, without limitation, a local area network ("LAN"), a virtual private network ("VPN"), a cellular network, or the Internet. The client network interface 212 may ultimate connect remote networked storage 214, or to server 216 via server network interface 218. Server network interface 218 may be one or more network interfaces as described with respect to client network interface 212.

Server 216 also has a processor 220 and memory 222. As per the preceding discussion regarding client device 202, memory 222 is any computer-readable media including both computer storage media and communication media.

In particular, memory 222 stores software which may include an application 224 and/or an operating system 226. Memory 206 may also store applications 224 that may include without limitation, an application server and a database management system. In this way, client device 202 may be configured with an application server and data management system to support a multi-tier configuration.

Server 216 may include a data store 228 accessed by the data management system. The data store 228 may be configured as a relational database, an object-oriented database, a NoSQL database, and/or a columnar database, or any configuration to support scalable persistence.

The server 216 may not be on site or operated by the client enterprise. The server 216 may be hosted in the Internet on a cloud installation 230. The cloud installation 230 may represent a plurality of disaggregated servers which provide cloud services, such as a virtual web application server 232 functionality and a virtual database 234 functionality. Cloud services 232 and 234 of the cloud installation 230 may be made accessible via cloud infrastructure 236. Cloud infrastructure 236 not only provides access to cloud services 232 and 234 but also billing services. Cloud infrastructure 236 may provide additional service abstractions such as Platform as a Service ("PAAS"), Infrastructure as a Service ("IAAS"), and Software as a Service ("SAAS").

Orchestration Software

Figure 3:
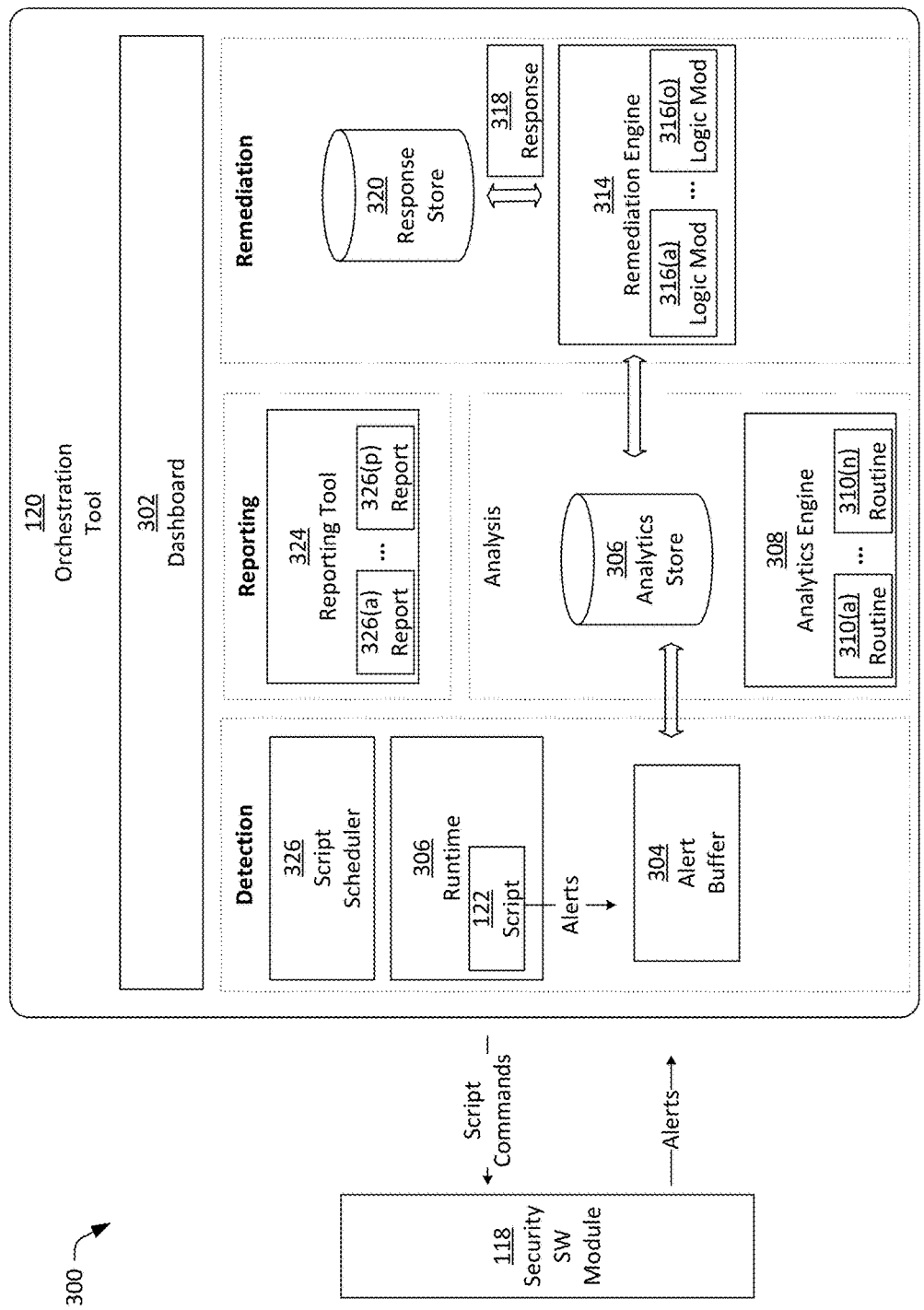
FIG. 3 is a block diagram for enterprise level security orchestration.

FIG. 3 is a block diagram 300 of the orchestration tool 120 and the server side orchestration software 128. The orchestration tool 120 includes a dashboard 302 that provides an integrated view of the security status of the installation 102. The dashboard 302 may show scans in progress, status of scans present and historical, reports and recommendations, and it may show present alerts. Accordingly, there are at least three types of notifications: (1) alerts from individual safeguard software packages 116, (2) alerts from scans in progress as orchestrated via scripts 122, and (3) surfaced recommendations not specific to a scan.

To receive alerts from individual safeguard software packages 116, the safeguard software package 116 may send an alert which is intercepted by the safeguard interface module 118. The safeguard interface module 118 then adds metadata identifying the safeguard software package 116, and itself, the safeguard interface module 118, and then forwards the alert and metadata directly to alert buffer 304. The dashboard 302, may then receive a notification that a new alert has been received in the alert buffer 304 and will update the dashboard user interface accordingly.

To receive alerts from scripts 122, a runtime of the orchestration tool 120 may execute a script. The script may then receive alerts from safeguard software packages 116 as forwarded by the safeguard interface modules 118. Alternatively, the script may create an alert of its own. The run time may then add metadata identifying the script 122, the mirror 126, the safeguard software package 116 and the safeguard interface module 118 that provided the alert. Both types of alerts are then forwarded by the runtime to the alert buffer 304. The dashboard 302 updates again by receive a notification from the alert buffer 304 as described above.

From time to time, the alert buffer 304 may populate an analytics store 306. An analytics engine 308 may then run analytics routines 310($a$)-310($n$) from time to time to identify threats. When a threat 312 is detected, the analytics engine 308 may create a record and populate the analytics store 306.

A remediation engine 314 monitors the analytics store 306 and detects threat patterns. The detection may be any number of remediation logic modules 316($a$)-316($o$). A remediation logic module 316 may be a hardcoded script from an administrator 114. For example, the remediation logic module 316 may simply state that where unauthorized access is via an open port, the module 316 is to close the port and surface a report. A remediation logic module 316 may employ a similarity measure and based on past behavior the administrator closed an open port upon detection of an unauthorized access, and the logic module 316 then closes all unused open ports proactively. A powerful remediation logic module 316 would be a module that implements any number of known machine learning algorithms to learn threats and to suggest responses 318. Responses 318 that are repeatedly accepted or used by the administrator are stored in response data store 320.

A reporting tool 322 creates reports 324($a$)-324($o$) based on the records of the analytics store 306 and surfaces the availability of those reports on dashboard 302. In some cases, the reporting tool 322 make be invoked by the remediation engine 314 to surface recommended responses as recommendations.

Both threat data, as stored in the analytics store 306 and potential responses as stored in the response data store 320 are not populated solely from scans of the installation. Third party data from the security community can also be loaded via the dashboard 302, thereby adding to the capabilities of the orchestration tool 120. In general, the orchestration tool 120 may aggregate data. A scheduler 326 is used to schedule the running of tests. Tests may be performed synchronously or asynchronously. Synchronous scheduling is described in further detail with respect to FIG. 5.

In various embodiments, the orchestration tool 120 may be implemented using a monolithic architecture or alternatively using a micro-services architecture. In a monolithic architecture, the software components of the orchestration tool 120 that provide the detection, reporting, and remediation services are integrated and resident on the same cloud installation rather than architecturally separate. However, in the micro-services architecture, the orchestration tool 120 may be implemented using independent running services (the micro-services) corresponding to discrete interacting software components that communicate with each other, and may not be resident on the same cloud.

In both the monolithic and the micro-services architectures, the services of the orchestration tool 120 may be implemented using different programming languages, databases, and/or software components, in which each of these elements may be easily substituted or replaced with a comparable element. In at least one embodiment, the micro-service architecture of the orchestration tool 120 may include, but is not limited to, services such as a web application service, a serving store, a messaging bus service, a streaming engine service, a scanning service, a distributed storage and processing service (e.g., Apache Hadoop™), and a scalable file storage system (e.g., Hadoop Distributed File System (HDFS™)).

Life Cycle of Enterprise Level Security Orchestration

Figure 4:
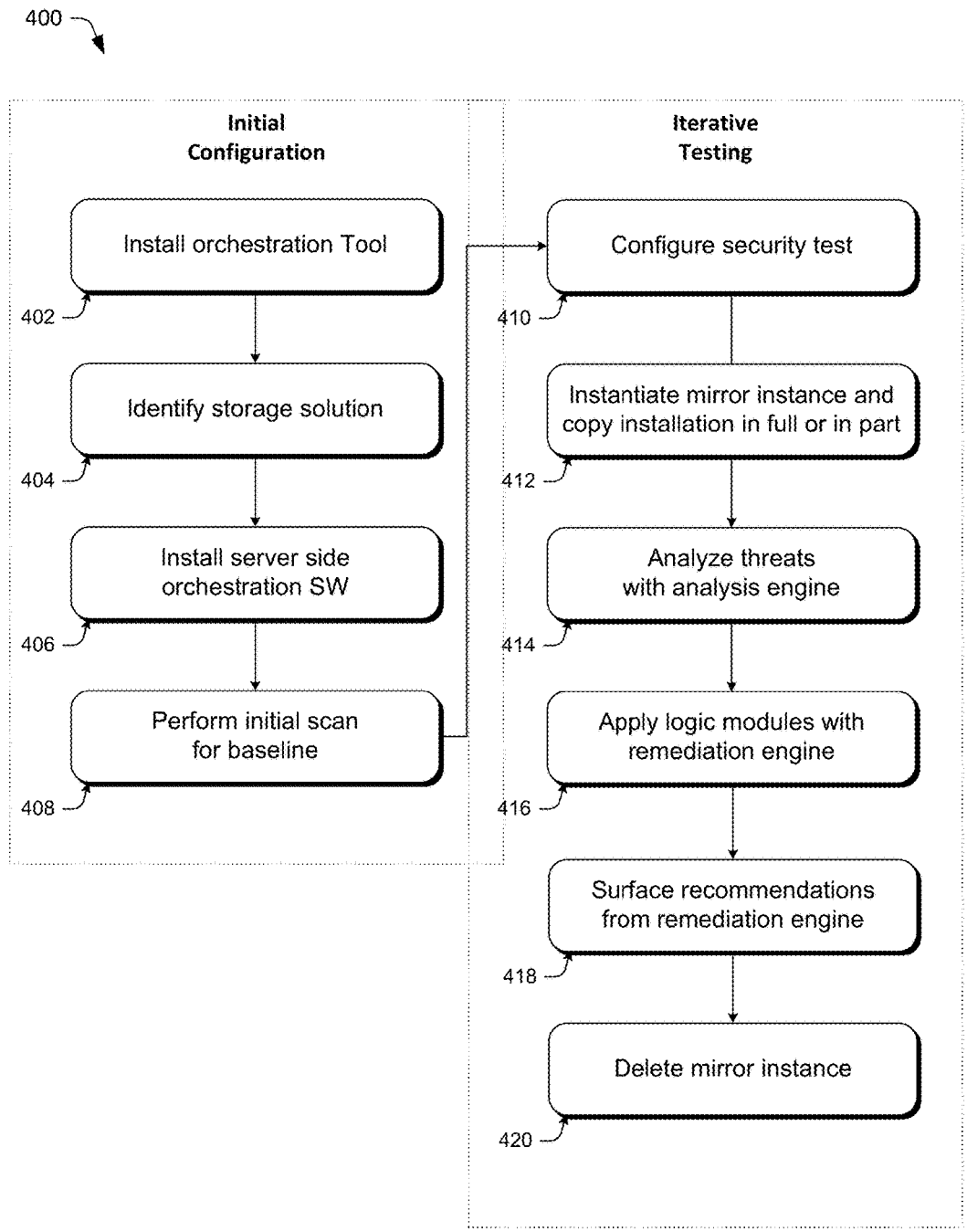
FIG. 4 is an illustration of a life cycle performing enterprise level security orchestration.

FIG. 4 is an illustration 400 of the life cycle of enterprise level security orchestration starting with an initial deployment. After the deployment, illustration 400 shows an exemplary continuing operation for enterprise level security orchestration.

In block 402, the orchestration tool 120 is installed. This includes installing the safeguard interface modules 118. Specifically, for every safeguard software package 116 installed, a corresponding safeguard interface module 118 is installed and configured to interface the safeguard software package 116 to the orchestration software.

In block 404, a storage solution is identified. Generally an external cloud storage solution is identified. However, alternatively a private cloud could also be implemented. In yet other embodiments, standard networked storage on a local area network may be chose as well. Thus storage could be either external, or on premises.

In block 406, the server side orchestration software 128 is installed. Where external cloud has been chosen in block 404, the server side orchestration software 128 may be configured to create mirrors of the installation 102 on demand. Where local storage has been chosen, the server side orchestration software 128 may be configured to allow the safeguard software packages 116 to operate directly on mirrored data.

In block 408, an initial scan may be performed. The installation's configuration along with the initial scan thereby provide a data baseline for the security state of the installation 102. At this point, the orchestration tool 120 is ready for operations.

In block 410, the orchestration tool 120 may be configured by an administrator 114 to run a particular security test, to perform continuous scanning, or to execute a script 122. The orchestration tool 120 may then perform the request as scheduled. Generally, the request may be performed on a mirror.

On demand, by the orchestration tool 120, in block 412, an installation 102 is mirrored in full or in part. The mirror 126 may generally include at least one application, as it would be installed in production, and a snapshot of the application's data. In the case of external cloud, copies of the safeguard software packages 116 and their respective safeguard interface modules 118 may also be installed.

Note that because the safeguard software packages 116 is also mirrored in block 412, versioning of the safeguard software packages 116 may not be tracked. The administrator 114 need only ensure that the safeguard software packages 116 are matched to the safeguard interface modules 118 and are properly configured prior to mirroring.

Generally replicating installations 102 is a time consuming process. However, commercial software, such as Actifio™ may be used to create mirrors in a timely fashion. Orchestration of replication is to be performed by the server side orchestration software 128.

During the performance of the security tests, in block 410, threats and alerts are detected by the safeguard software packages 116 via the scripts 122. The alerts are stored in the alert buffer 304, and where alerts that are determined to be threats 312 are stored in the analytics store 306.

In block 414, an analytics engine 308 analyzes the threats 312 in the analytics store 306 to detect threat patterns. Upon detection of threat patterns, in block 416, a remediation engine 314 is engaged. The remediation engine 314 employs a number of remediation logic modules 316 to identify potential responses 318. In block 418, responses 318 are surfaced as recommendations to the dashboard 302. In some cases responses 318 are automatically executed.

Note that reporting can be done in conjunction with past scans. For example, a second scan could be compared to the initial scan performed in block 408. Instead of surfacing all issues, such as issues indicated by threat patterns and associated responses, only new issues would be surfaced by removing all issues (e.g., threat patterns and associated responses) identified in the initial scan. In this way, a "delta report" could be generated.

In block 420, the mirror 126 may then be deleted by the orchestration engine. In this way the mirror will not pose a security risk where data could be exposed. At this point, operation can return back to block 412 to perform another scheduled test, scan, or script execution.

Synchronous Scanning

Figure 5:
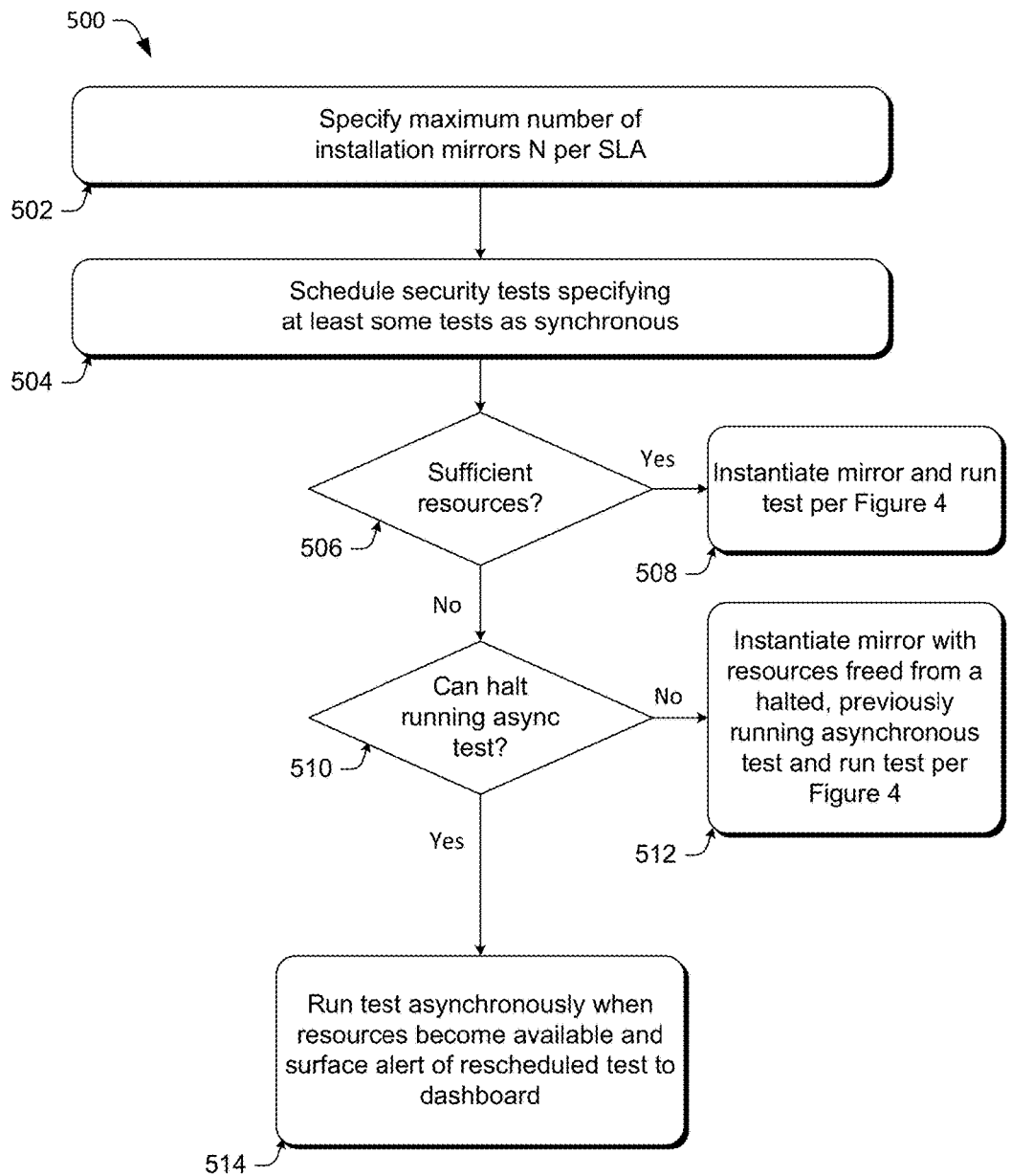
FIG. 5 is a flow chart for synchronous mirroring for enterprise level security orchestration.

The discussion with respect to FIG. 4 is described sequentially and asynchronously. However, as mentioned above, testing may be performed synchronously. The insight is that multiple mirrors 126 may be instantiated in storage, and therefore different tests may be performed in parallel. In particular, because different safeguard software packages 116 operate on an entire mirror, running two or more packages in parallel on the same mirror at the same time would likely create race conditions. By running the two safeguard software packages 116 each on their own respective mirror 126, race conditions are avoided. To perform synchronous scanning, tests are to be scheduled synchronously. The scheduling functionality is largely performed by the scheduler 326 in the orchestration tool 120. FIG. 5 is a flow chart 500 describing synchronous scanning In block 502, an administrator 114 specifies the maximum number of mirrors N that are covered by a service level agreement (SLA) with the cloud provider of cloud 124. While theoretically, the cloud 124 could run an unlimited number of mirrors, the administrator 114 may limit N based on cost.

In block 504, the administrator 114 schedules security tests. Tests may be marked as synchronous. Alternatively, multiple tests could be scheduled to run at the same time, in which case the scheduler 326 assumes that the tests are to be run synchronously.

In block 506, if a test is scheduled at the present time, the scheduler 326 checks to see if there is sufficient computing resource capacity to create a mirror. If there is, in block 508, the mirror is instantiated, and the test is run as per FIG. 4. If there is insufficient capacity, the scheduler 326 checks to see if there is a currently running asynchronous test at decision block 510. If there is, then in block 512, the currently running asynchronous test on another mirror is halted, a new mirror is instantiated using the newly freed resources, and the test is run as per FIG. 4. If no currently running asynchronous test can be identified, then in block 514 the scheduler 326 schedules test run asynchronously and an alert is surfaced to the dashboard. The scheduler can be set with options where a test that cannot be run synchronously is simply not run.

Billing Options

The present system and methods are also to support various billing models. Some options are described as follows. One model would be to charge per safeguard software package 116 configuration or per test. In this model, each different safeguard interface module 118, corresponding to a safeguard software package 116, may be marked with an identifier such as a globally unique identifier (GUID). Whenever the package was detected as running, the dashboard 302 could track whether the package was used, for what purpose, and the frequency of use. Another model would be to charge per mirrored instance. Because the server side orchestration software 128 is responsible for mirroring, it could track the number of mirrors created and whether a test completed successfully. Individual mirrors could be tracked timestamp or alternatively via an identifier such as a GUID. In this way, the volume of computing resources could be tracked.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    receiving, via one or more computing instances that include one or more processors and memory storing instructions executable by the one or more processors, a request to perform a security test on an installation that includes at least one production application, associated application data of the at least one production application, and a plurality of safeguard software packages providing different safeguarding functions to the at least one production application or the associated application data;
    instantiating, via the one or more computing instances, a mirror of an installation at a storage location, the mirror of the installation including at least one mirrored application that is a duplicate of the at least one production application, associated duplicate application data of the at least one mirrored application, and a plurality of mirrored safeguard software packages that are duplicates of the plurality of safeguard software packages;
    executing, via the one or more computing instances, an orchestration routine of the security test by an orchestration tool to call one or more mirrored safeguard software packages in the mirror to detect one or more alerts with respect to the at least one mirrored application, the one or more alerts identifying threats to the at least one mirrored application;
    applying, via the one or more computing instances, at least one machine learning logic of a remediation engine to detect at least one threat pattern based on the threats and identify one or more responses to the at least one threat pattern;
    surfacing, via one or more computing instances, at least one response as one or more recommendations via a dashboard user interface that is provided by the orchestration tool; and
    deleting, via the one or more computing instances, the mirror of the installation from the storage location.

2. The computer-implemented method of claim 1, further comprising comparing, via the one or more computing instances, a plurality of threat patterns detected by the at least one machine learning logic of a remediation engine to one or more threat patterns detected via a previous security test of the installation, wherein the surfacing includes surfacing a response for a threat pattern that is different from the one or more threat patterns detected via the previous security test.

3. The computer-implemented method of claim 1, further comprising executing, via the one or more computing instances, an additional orchestration routine of an additional security test on an additional mirror of the installation asynchronously using the orchestration tool to detect one or more additional threat patterns.

4. The computer-implemented method of claim 1, further comprising synchronously executing, via the one or more computing instances, an additional orchestration routine of an additional security test on an additional mirror of the installation using the orchestration tool while the orchestration routine of the security test on the mirror is performed by the orchestration tool when sufficient computing resources are available.

5. The computer-implemented method of claim 4, wherein the synchronously executing another orchestration routine when sufficient computing resources are available includes:
    determining, via the one or more computing instances, whether there is sufficient computing resource capacity on a cloud to instantiate the additional mirror of the installation in accordance with a service level agreement (SLA),
    instantiating, via the one or more computing instances, the additional mirror of the installation in response to a determination that there is sufficient computing resource capacity on the cloud;
    halting, via the one or more computing instances, an asynchronous security test on another mirror of the installation to free up computing resource capacity and instantiating the additional mirror of the installation in response to a determination that there is insufficient computing resource capacity on the cloud and an asynchronous security test on another mirror of the installation is already running; and
    executing, via the one or more computing instances, the additional orchestration routine of the additional security test on the additional mirror of the installation.

6. The computer-implemented method of claim 5, further comprising asynchronously executing, via the one or more computing instances, the additional orchestration routine of the additional security test on the additional mirror of the installation in response to determining that there is insufficient computing resource capacity on the cloud and no asynchronous security test on another mirror of the installation is running.

7. One or more non-transitory computer-readable media storing computer-executable instructions that upon execution cause one or more processors to perform acts comprising:
    receiving a request to perform a security test on an installation that includes at least one production application, associated application data of the at least one production application, and a plurality of safeguard software packages providing different safeguarding functions to the at least one production application or the associated application data;
    instantiating a mirror of an installation at a storage location, the mirror of the installation including at least one mirrored application that is a duplicate of the at least one production application, associated duplicate application data of the at least one mirrored application, and a plurality of mirrored safeguard software packages that are duplicates of the plurality of safeguard software packages;
    executing an orchestration routine of the security test by an orchestration tool to call one or more mirrored safeguard software packages in the mirror to detect one or more alerts with respect to the at least one mirrored application, the one or more alerts identifying threats to the at least one mirrored application;
    applying at least one machine learning logic of a remediation engine to detect at least one threat pattern based on the threats and identify one or more responses to the at least one threat pattern;

surfacing at least one response as one or more recommendations via a dashboard user interface that is provided by the orchestration tool; and deleting the mirror of the installation from the storage location.

8. The one or more non-transitory computer-readable media of claim 7, wherein the acts further comprise comparing a plurality of threat patterns detected by the at least one machine learning logic of a remediation engine to one or more threat patterns detected via a previous security test of the installation, wherein the surfacing includes surfacing a response for a threat pattern that is different from the one or more threat patterns detected via the previous security test.

9. The one or more non-transitory computer-readable media of claim 7, wherein the acts further comprise executing an additional orchestration routine of an additional security test on an additional mirror of the installation asynchronously using the orchestration tool to detect one or more additional threat patterns.

10. The one or more non-transitory computer-readable media of claim 7, wherein the acts further comprise synchronously executing an additional orchestration routine of an additional security test on an additional mirror of the installation using the orchestration tool while the orchestration routine of the security test on the mirror is performed by the orchestration tool when sufficient computing resources are available.

11. The one or more non-transitory computer-readable media of claim 10, wherein the synchronously executing another orchestration routine when sufficient computing resources are available includes:
determining whether there is sufficient computing resource capacity on a cloud to instantiate the additional mirror of the installation in accordance with a service level agreement (SLA),
instantiating the additional mirror of the installation in response to a determination that there is sufficient computing resource capacity on the cloud;
halting an asynchronous security test on another mirror of the installation to free up computing resource capacity and instantiating the additional mirror of the installation in response to a determination that there is insufficient computing resource capacity on the cloud and an asynchronous security test on another mirror of the installation is already running; and
executing the additional orchestration routine of the additional security test on the additional mirror of the installation.

12. The one or more non-transitory computer-readable media of claim 11, wherein the acts further comprise asynchronously executing the additional orchestration routine of the additional security test on the additional mirror of the installation in response to determining that there is insufficient computing resource capacity on the cloud and no asynchronous security test on another mirror of the installation is running.

13. A system, comprising:
one or more processors; and
memory including a plurality of computer-executable components that are executable by the one or more processors to perform a plurality of actions, the plurality of actions comprising:
receiving a request to perform a security test on an installation that includes at least one production application, associated application data of the at least one production application, and a plurality of safeguard software packages providing different safeguarding functions to the at least one production application or the associated application data;
instantiating a mirror of an installation at a storage location, the mirror of the installation including at least one mirrored application that is a duplicate of the at least one production application, associated duplicate application data of the at least one mirrored application, and a plurality of mirrored safeguard software packages that are duplicates of the plurality of safeguard software packages;
executing an orchestration routine of the security test by an orchestration tool to call one or more mirrored safeguard software packages in the mirror to detect one or more alerts with respect to the at least one mirrored application, the one or more alerts identifying threats to the at least one mirrored application;
applying at least one machine learning logic of a remediation engine to detect at least one threat pattern based on the threats and identify one or more responses to the at least one threat pattern;
surfacing at least one response as one or more recommendations via a dashboard user interface that is provided by the orchestration tool; and
deleting the mirror of the installation from the storage location.

14. The system of claim 13, wherein the actions further comprise comparing a plurality of threat patterns detected by the at least one machine learning logic of a remediation engine to one or more threat patterns detected via a previous security test of the installation, wherein the surfacing includes surfacing a response for a threat pattern that is different from the one or more threat patterns detected via the previous security test.

15. The system of claim 13, wherein the actions further comprise executing an additional orchestration routine of an additional security test on an additional mirror of the installation asynchronously using the orchestration tool to detect one or more additional threat patterns.

16. The system of claim 13, wherein the actions further comprise synchronously executing an additional orchestration routine of an additional security test on an additional mirror of the installation using the orchestration tool while the orchestration routine of the security test on the mirror is performed by the orchestration tool when sufficient computing resources are available.

17. The system of claim 16, wherein the synchronously executing another orchestration routine when sufficient computing resources are available includes:
determining whether there is sufficient computing resource capacity on a cloud to instantiate the additional mirror of the installation in accordance with a service level agreement (SLA),
instantiating the additional mirror of the installation in response to a determination that there is sufficient computing resource capacity on the cloud;
halting an asynchronous security test on another mirror of the installation to free up computing resource capacity and instantiating the additional mirror of the installation in response to a determination that there is insufficient computing resource capacity on the cloud and an asynchronous security test on another mirror of the installation is already running; and
executing the additional orchestration routine of the additional security test on the additional mirror of the installation.

18. The system of claim 17, wherein the actions further comprise asynchronously executing the additional orchestration routine of the additional security test on the additional mirror of the installation in response to determining that there is insufficient computing resource capacity on the cloud and no asynchronous security test on another mirror of the installation is running.

* * * * *